United States Patent [19]
Edstrom et al.
[11] 3,864,525
[45] Feb. 4, 1975

[54] TIME STAGE SYSTEM FOR A PCM EXCHANGE

[75] Inventors: Nils Herbert Edstrom, Stockholm; Stig Gustaf Wilhelm Lindqvist, Enskede; Gunnar Erik William Sparrendahl, Handen, all of Sweden

[73] Assignee: Telefonaktiebolaget LM Ericsson, Stockholm, Sweden

[22] Filed: Jan. 19, 1973

[21] Appl. No.: 325,057

[30] Foreign Application Priority Data

Feb. 8, 1972 Sweden ............................ 1442/72

[52] U.S. Cl. ........................................ 179/15 AQ
[51] Int. Cl. ........................................ H04q 11/04
[58] Field of Search ........ 179/15 AQ, 15 AT, 15 BS

[56] References Cited

UNITED STATES PATENTS

| | | | |
|---|---|---|---|
| 3,458,659 | 7/1969 | Sternung | 179/15 AQ |
| 3,597,548 | 8/1971 | Drinnan | 179/15 AT |
| 3,715,505 | 2/1973 | Gordon et al. | 179/15 AQ |

*Primary Examiner*—Kathleen H. Claffy
*Assistant Examiner*—Joseph A. Popek
*Attorney, Agent, or Firm*—Hane, Baxley & Spiecens

[57] ABSTRACT

A time stage system included in a PCM exchange working according to the time-space-time principle is connected to incoming and outgoing transmission links on which PCM words are received and sent out, and further connected to files (= highways) on which said PCM words are transferred to and from file contact planes for space switching. In order to decentralize the control of the time switching, the time stage system is divided into time substages each of which being connected to associated incoming and outgoing links. Each time substage is divided in time stage units each of which being connected to the associated links and to two associated files of which one goes to and the other comes from the file contact plane cooperating with the time stage unit. Each time substage includes as many time stage units as there are file contact planes. For time switching, each time stage unit comprises word memories and index memories. The PCM words are written cyclically into the word memories from which they are read randomly with the aid of indexes stored in the index memories or vice versa. For allotting address numbers to the PCM words, each time stage unit comprises an address memory connected to the outgoing file. Blocking devices guarantee that writing and reading never coincide in the same word memory and that an address number defining the space switching for a PCM word is transferred to the respective file contact plane immediately before such PCM word.

2 Claims, 10 Drawing Figures

PATENTED FEB 4 1975

3,864,525

SHEET 2 OF 8

PATENTED FEB 4 1975 3,864,525

SHEET 4 OF 8

TIME STAGE SYSTEM FOR A PCM EXCHANGE

Figures 1, 2:
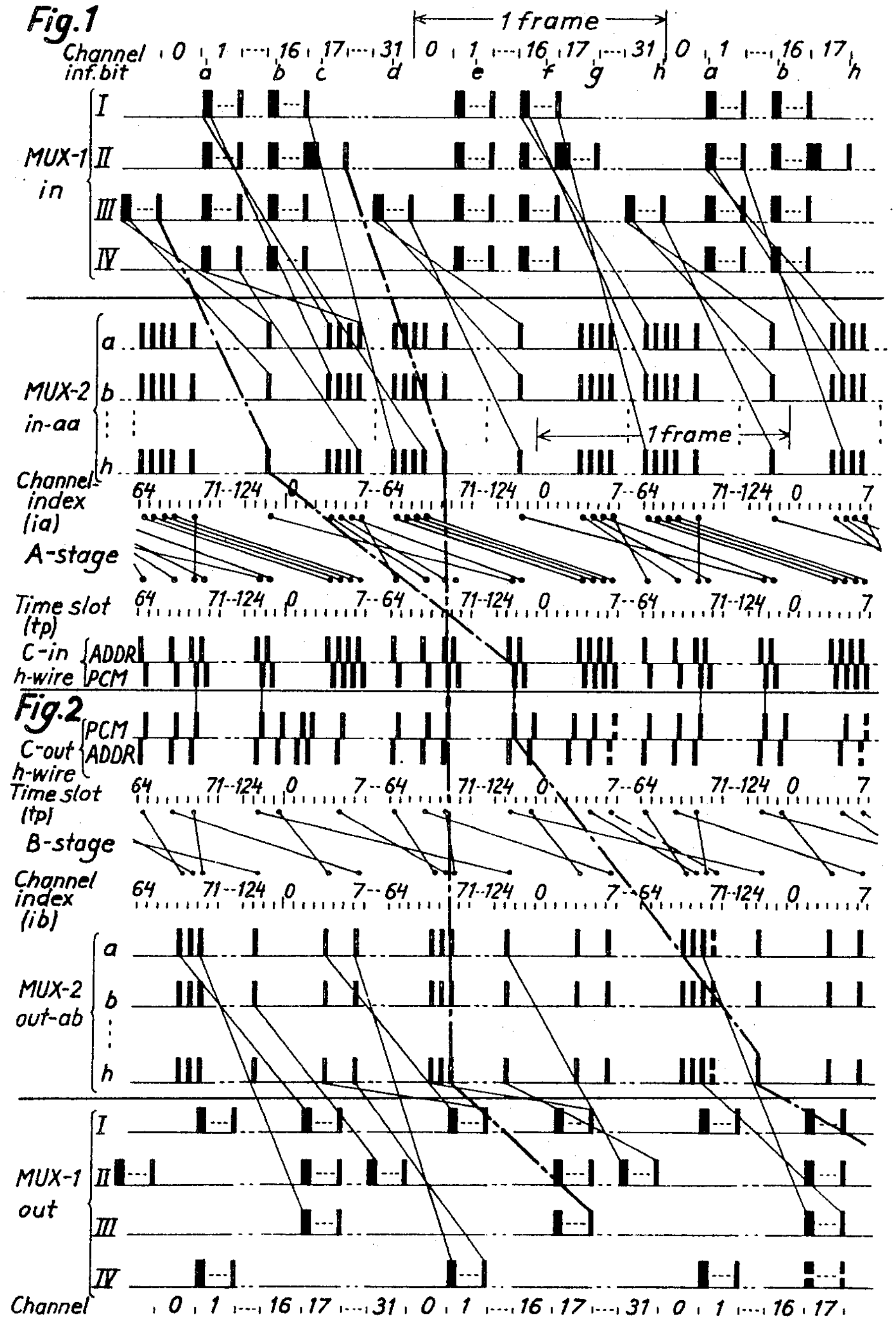

This invention relates to a time stage system for allotting time slots and adding addresses to PCM words in an exchange comprising a first time stage, a space stage and a second time stage ("time-space-time" system) to and from which the PCM words are received and sent out on transmission links in a first time division multiplex system and through which stages the PCM words are transmitted on files (= highways) from the first time stage via the space stage to the second time stage in a second division multiplex system.

The U.S. Pat. No. 3,458,659 describes a system for selecting the establishment of communication paths between pulse code modulated links, which comprises a non-block multistage selected transmission of digital information words. The British Pat. No. 1,163,545 describes a time division multiplex three-stage selector network in which the rows and columns of the intermediate stage consist of time division multiplex files and which is controlled by a common control unit. The article "Koppelnetze fur Zeitmultiplex-Vermittlungsstellen" in NTZ 1970, vol. 9, describes the use of parallel multiplex systems and of the TST (time-space-time) transmission principle in such exchanges. A parallel multiplex system is obtained if all incoming and outgoing links and files between the selector networks consist of a number of parallel wires on which sequences of information bits are transmitted so that, in a PCM channel, digital words are transmitted in parallel form, each containing one bit of the bit sequence of each wire. If a parallel multiplex system comprises $n_2$ channels on each of $m$ wires, and if a sampling frequency $f_s$ is used, of which one cycle is denoted as a frame, PCM words are obtained with m bits and in every wire the bit frequency will be $f_{b2} = f_s \cdot n_2$. The TST principle signifies that a first time stage is arranged for receiving of PCM words which arrive on channels of a first time division multiplex system, in order to produce a second time division multiplex system, in order to allot to each PCM word, determined by its channel index, a time slot for the communication path in question in the second time division multiplex system and in order to send PCM words over a file using the second time division multiplex system to a space stage, the words in a specific incoming link being transmittable only over one file in a group of files alloted to said link. The TST principle also signifies that the space stage is arranged to produce a space connection, determined by the communication path in question, between the file coming from the first time stage and a file going to a second time stage, there being no change in respect to the time slot alloted in the second time multiplex system, and that, finally, the second time stage is arranged in order to produce the first time division multiplex system again, in order to allot to each time slot in the second system a channel index, determined by the communication path in question, in the first system and in order to send out the PCM words on the outgoing link.

The known TST-transmission is explained by means of the accompanying FIGS. 1 and 2, which show in a time diagram how the PCM words are transmitted from an incoming parallel multiplex link, MUX-2-in-*aa*, to an outgoing parallel multiplex link, MUX-2-out-*ab*. It is assumed that the number of parallel wires is $m = 8$, the number of channels $n_2 = 128$ defined through the indices 0–127, and the sampling frequency $f_s = 8{,}000$ c/s, i.e., the bit frequency is $f_{b2} = 8{,}000 \times 128 = 1{,}024{,}000$ Hz. It is also assumed that PCM words arrive on the channels with the indexes 4, 5, 6, 7, 64, 65, 66, 67, 69, 126. The eight wires of the link are denoted *a*, *b . . . h* and the bit sequence in the example is repeated for every wire and for every frame. For preparation of the space connection in the space stage C said sequence is reversed in the first time stage A, for example with the and of Table 1, to a second sequence in which the bits are transmitted on one of the files of the C stage, C-in. It is assumed that the PCM words are transmitted to the C stage in parallel form and in a second time division multiplex system which complies with the first time division multiplex system of the incoming and outgoing links, so that a length of a time slot *tp*, defined by one of the slot numbers 0–127, complies with one cycle of the bit frequency $f_{b2}$.

Table 1

| Incoming channel index (*ia*) | 4 | 5 | 6 | 7 | 64 | 65 | 66 | 67 | 69 | 126 |
|---|---|---|---|---|---|---|---|---|---|---|
| Time slot (*tp*) | 67 | 70 | 126 | 64 | 4 | 5 | 6 | 7 | 69 | 125 |

Table 1 is indicated in FIG. 1 under the heading A-stage, where it is shown to which time slot the respective associated channel index is to be converted. Under the heading C-in/PCM is shown the reversed bit sequence 4, 5, 6, 7, 64, 67, 69, 70, 125, 126, which is repeated for every frame and every wire of the 8 parallel wires of the respective C-in file, of which FIG. 1 shows only the *h*-wire. In the example it is assumed that the time slots with the slot numbers 69 and 125 of the file incoming to the C stage are to be connected to the same file C-out outgoing from the C stage, of which only the *h*-wire is shown in FIG. 2. The bits transmitted during the rest of the time slots on the file incoming to the C stage are transmitted to other outgoing files not shown. The example shows for the file outgoing from the C stage a bit sequence with the slot numbers 5, 64, 67, 69, 125 and 127, of which the bits on the time slots with slot numbers 5, 64, 67 and 127 come from incoming links not shown in FIG. 1. The sequence on the file outgoing from the C stage constitutes a third sequence of time slots which, according to Table 2 for example, is converted in the second time stage B.

Table 2

| Time slot (*tp*) | 5 | 64 | 67 | 69 | 125 | 127 | (7) |
|---|---|---|---|---|---|---|---|
| Outgoing channel index (*ib*) | 69 | 68 | 7 | 70 | 125 | 4 | (71) |

(...) according to a new input switching order information described on page 17.

FIG. 2 shows the outgoing link, MUX-2-out-*ab* with its wires *a, b . . . h*, which, according to the example selected, transmit for each frame a bit sequence for the channels with indexes 4, 7, 68, 69, 70, 125.

For establishment of the cyclically framewise repeated connections for the transmission of PCM words on the TST principle is known exchanges, both the time stage and the space stage are provided with switching networks of files and file contacts which are controlled by means of a common, extensive and complicated control unit which, apart from a computer and a clock generator, comprises for each file contact a decoder and a contact memory with an operating word for every time slot within a frame. There is a great tendency for operational disturbances, since it is difficult in present exchanges to synchronize the control of the contact memories and the first and second time division multiplex systems of the PCM words owing to the variations in reaction time of the file contacts and owing to differences in transit times which arise when the control unit and the time stages and space stage must be separately located. There is also the disadvantage that the contact memories need an extensive communication system of their own both with the file contacts and with the computer which selects time slots for setting up of the connections and controls the input into and output from the contact memories.

The object of the invention is to avoid the file contacts entirely in the first and second time stages of the exchange and to reduce and decentralize the control unit so that said disadvantages are eliminated and the load on the computer is lessened.

Figure 3:
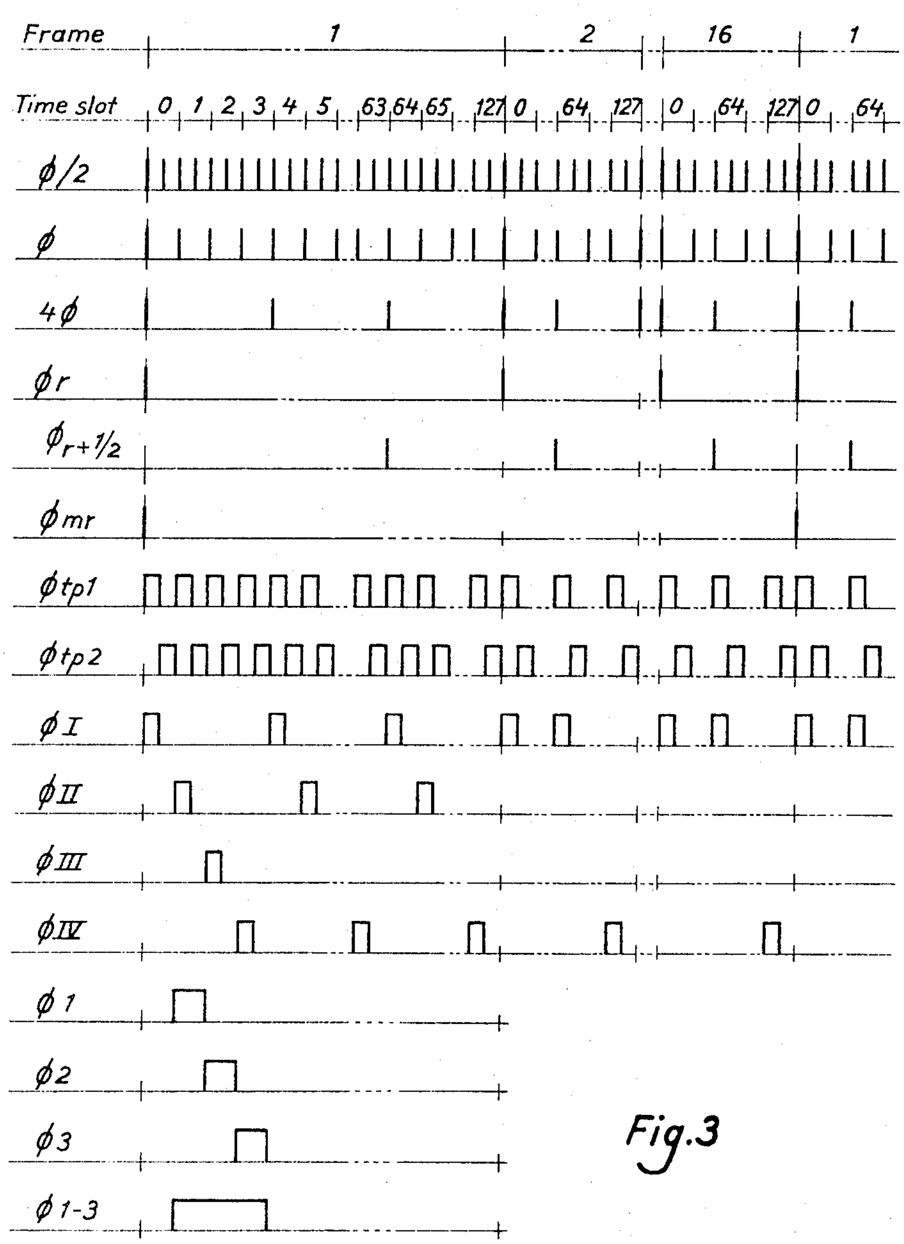
Figure 4:
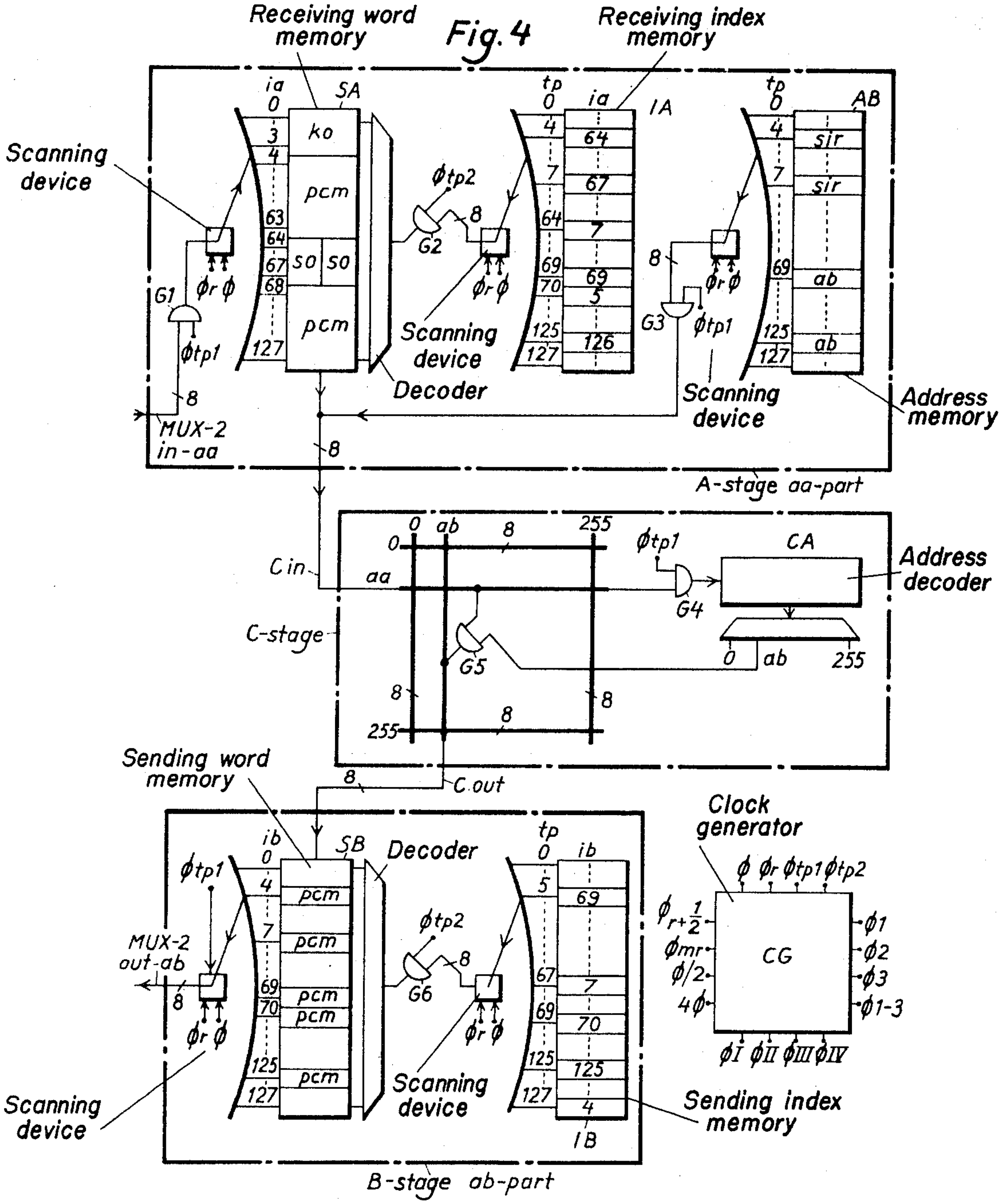
Figure 5:
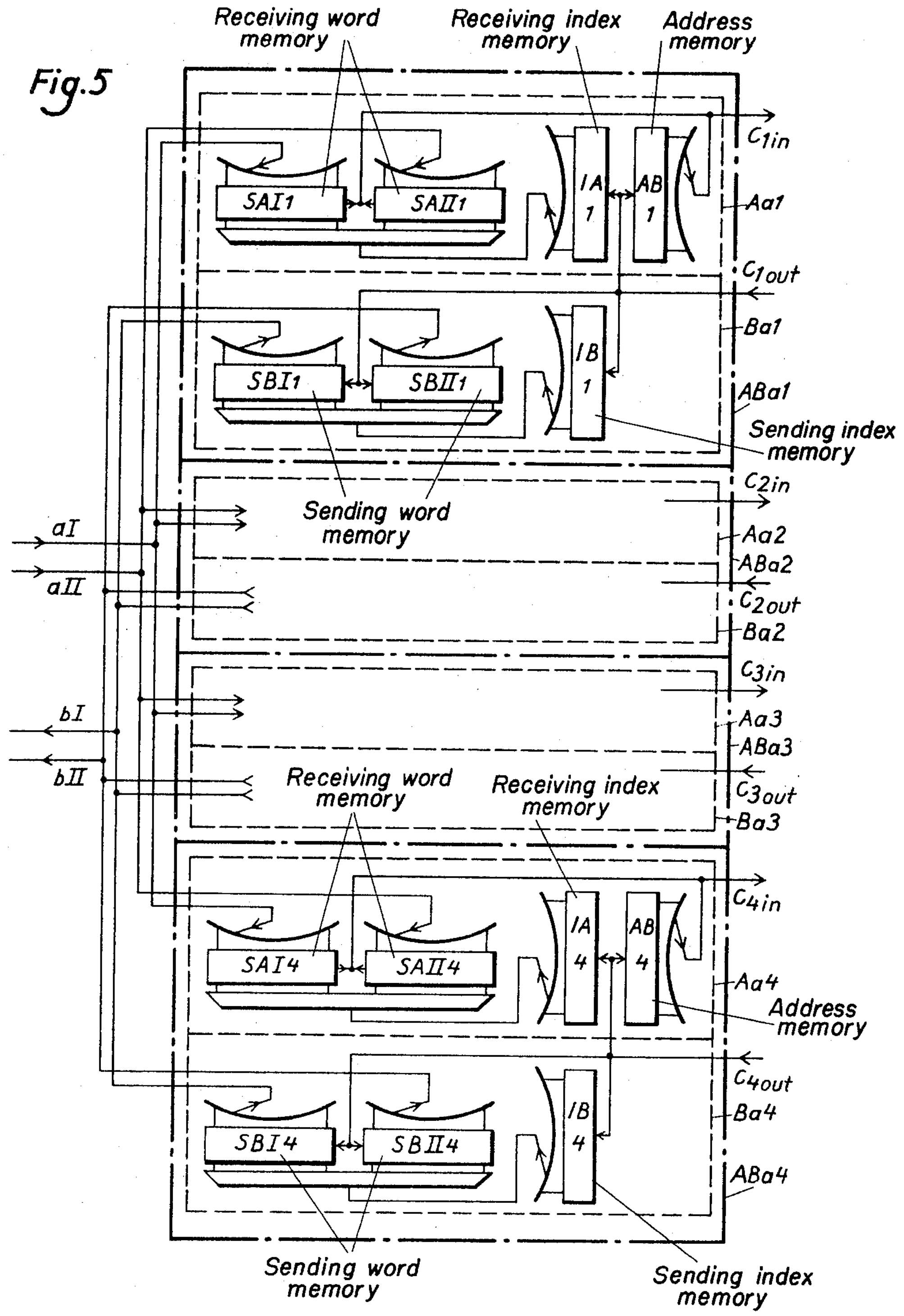
Figures 6, 10:
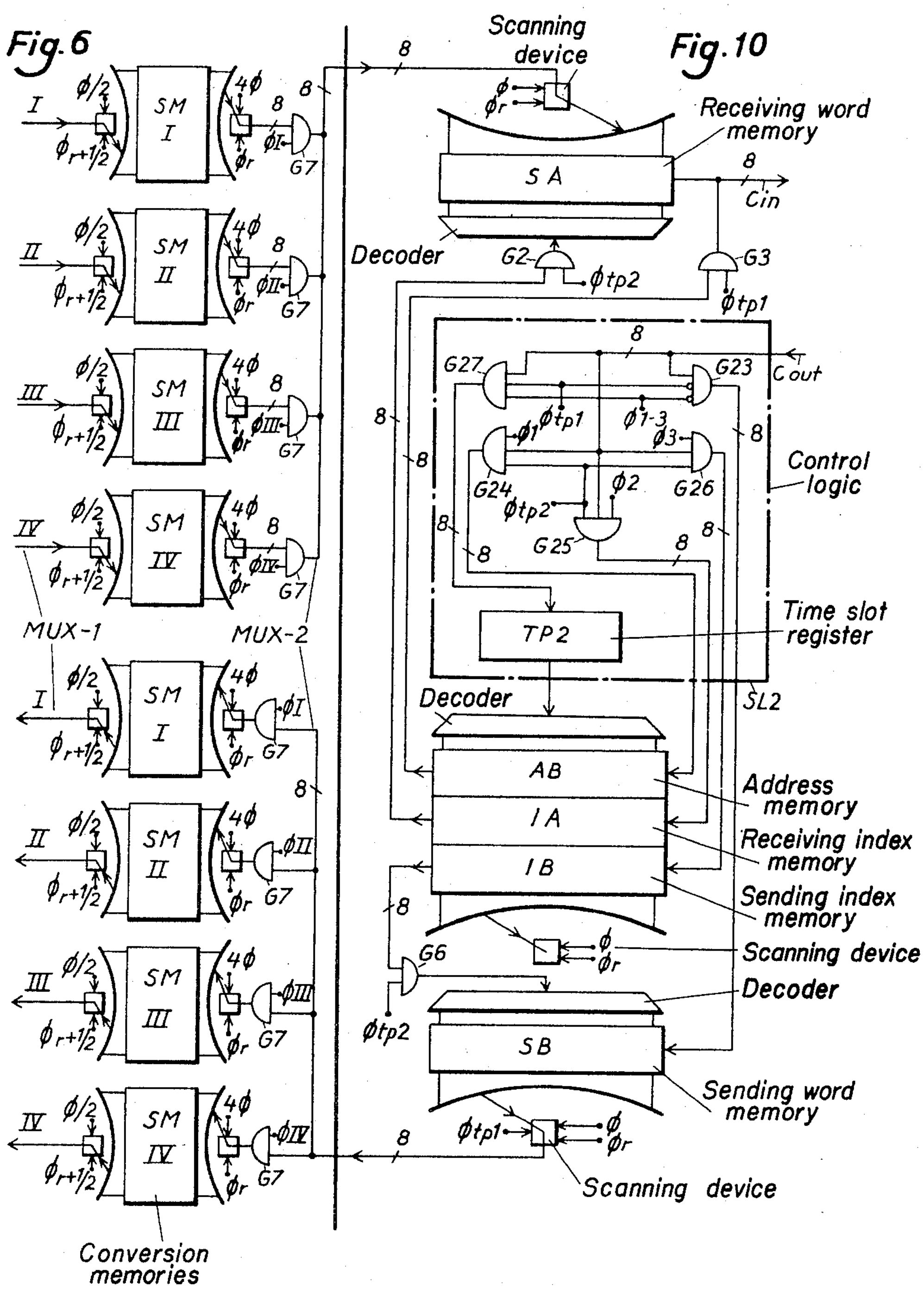
Figure 8:
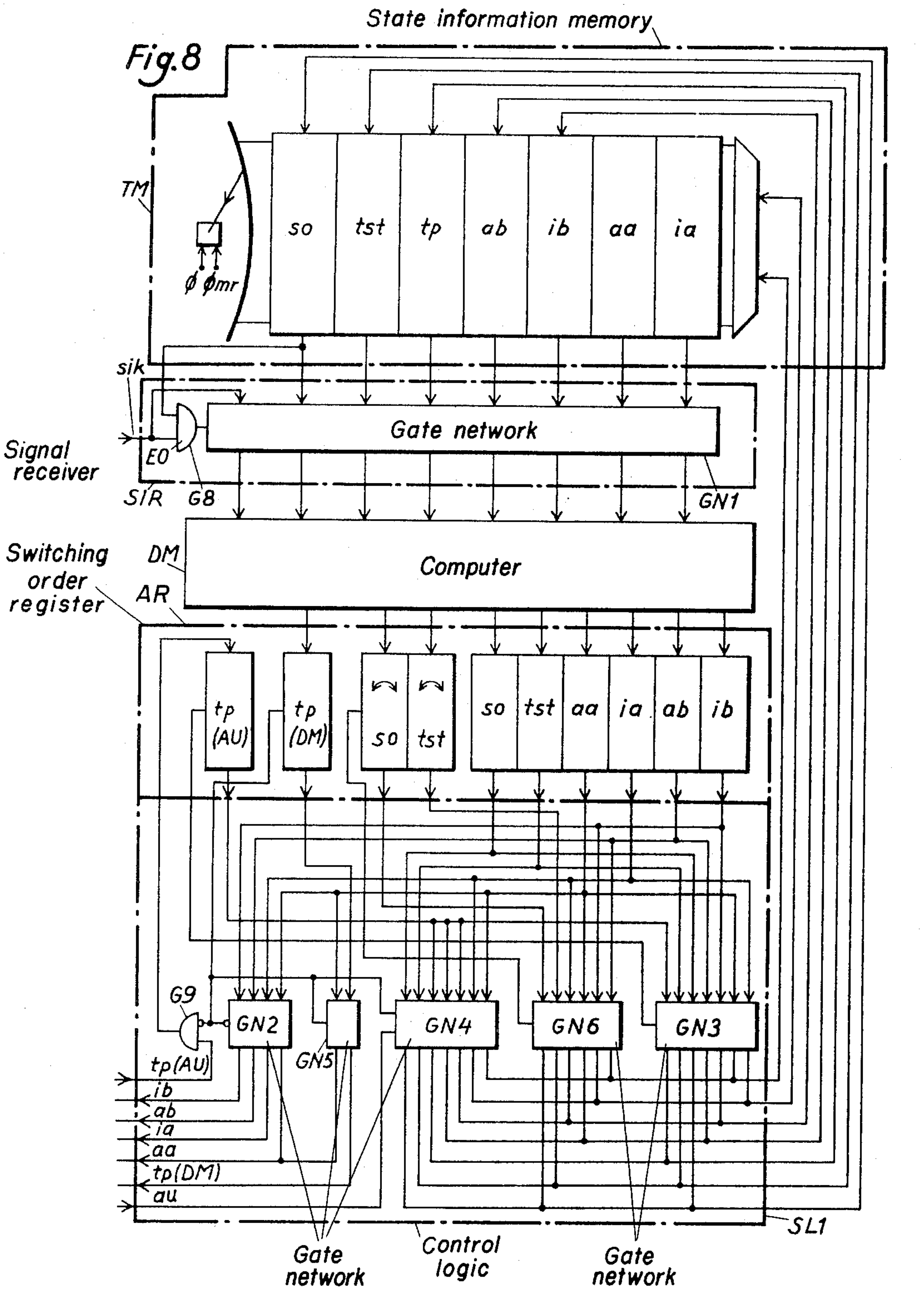
Figure 9:
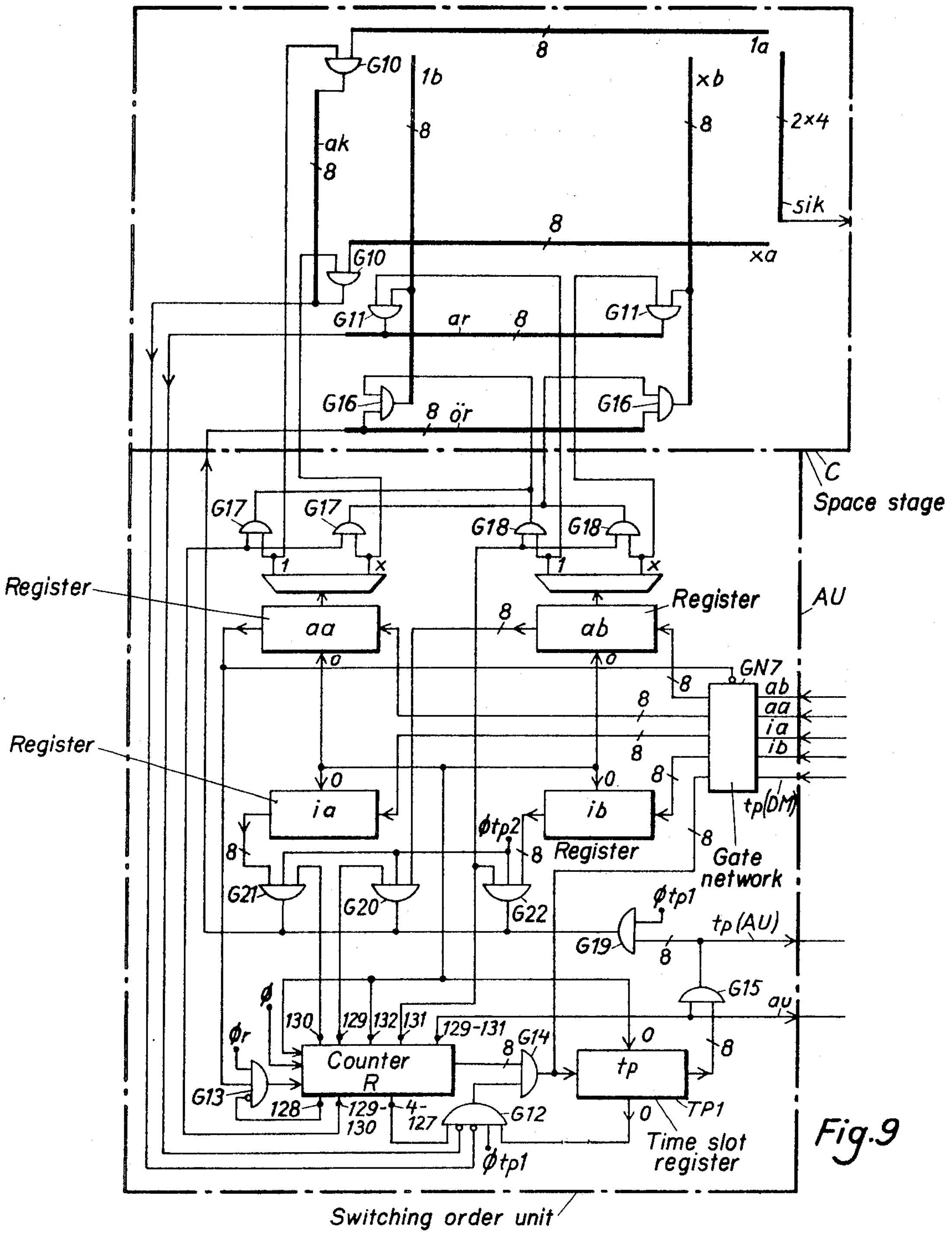

The invention will be explained with reference to the time diagram in FIGS. 1 and 2 and to the description of an exchange, FIG. 3 showing a time diagram with signals and pulses from a clock generator common to the exchange, FIG. 4 showing parts which are in operation when a switching order information is registered in switching order memories, FIG. 5 showing a time substage for a non-blocking type of exchange. FIG. 6 showing a device for conversion of a PCM series transmission into a PCM parallel transmission and vice versa, FIG. 7 which is a block diagram of the exchange, and FIGS. 8 – 10 showing the parts of the exchange which are in operation in conjunction with setting up and clearing (disconnecting) of paths.

The clock generator of the exchange which is described in conjunction with the invention is stepped with a frequency $f_{b1} = 2 \cdot f_{b2}$ and is provided with a number of outlets $\phi$/2, $\phi$, 4$\phi$, $\phi r$, $\phi r + ½$ and $\phi mr$, on which synchronization pulses are obtained, and with a number of outlets $\phi tp$1, $\phi tp$2, $\phi$I, $\phi$II, $\phi$III, $\phi$IV, $\phi$1, $\phi$2, $\phi$1–3, on which time signals are obtained. FIG. 3 shows the length of the time signals in use and the time-dependent relation between all pulses and signals obtained on the clock generator outlets. On outlet $\phi$/2 a pulse is obtained at every stepping of the clock generator, on outlet $\phi$ a pulse is obtained at every other stepping of the clock generator, i.e., at the start of each period of the bit frequency $f_{b2}$ which is assumed to coincide with a time slot, and on outlet 4$\phi$ a pulse is obtained at the start of each fourth time slot. At the start of each frame there is obtained on outlet $\phi r$ a frame pulse which coincides with one of the pulses on outlet 4$\phi$. Finally on outlets $\phi$mr and $\phi r + ½$ are obtained, respectively, pulses at the start of each 16 frame and frame pulses which are displaced in time a half frame in relation to the pulses obtained on outlet $\phi r$. The outlets $\phi tp$1 and $\phi tp$2 are activated during the first and second halves of the time slots respectively, the outlets $\phi$I to $\phi$IV are activated during the first half of each fourth time slot and are selected in such a way that successive time slots are associated with the respective outlets, outlet $\phi$I being activated during the first half of the first time slot of a frame, and the outlets $\phi$1, $\phi$2, $\phi$3 and $\phi$1–3 being activated during the time slots numbered 1, 2, 3 and 1–3 of the slot numbers 0–127 belonging to the time slots of a frame.

FIG. 4 shows, apart from the clock generator CG with said synchronization and signal outlets, the main parts of the A, B and C stages of the exchange with three switching order memories IA, AB, IB. It is assumed that a registration exists for a channel with channel index ia of an incoming link with link address *aa* with a channel with channel index *ib* of an outgoing link with link address *ab.* Associated with each incoming link is a receiving index memory IA for registration of the channel index *ia* of the link and an address memory AB for registration of addresses *ab* to outgoing links, and associated with each outgoing link is a sending index memory IB for registration of the channel index *ib* of the link. Each incoming link e.g., that shown in FIG. 4 with the address *aa* (its parallel transmission of 8 bits is indicated in the figure), feeds in the first time stage A via a gate multiple G1 a receiving word memory SA associated with said incoming link, in which receiving word memory the PCM words are written in the sequence determined by the increasing indexes of the channels. The gate multiple G1 is connected to outlet $\phi tp$1 of the clock generator so that the input into the receiving word memory SA, which input is controlled cyclically by outlets $\phi r$ and $\phi$ of the clock generator, always takes place during the first halves of a bit length. This is shown also in the time diagram in FIG. 1 where, in the incoming MUX-2 link, the PCM words are transmitted during the first halves of a bit length.

For read-out of the PCM words from the receiving word memory SA the order of sequence is determined by a reading, synchronously with said writing in, of said receiving index memory IA in which the channel indexes are registered in another sequence, as explained for example in conjunction with Table 1. In FIG. 4 this is indicated through the respective index registrations in associated time slots. Between the receiving index memory and receiving word memory a decoder is arranged in a known manner, which is activated during the second half of each time slot by means of a gate multiple G2 which is connected to outlet $\phi tp$2 of the clock generator. In this way the gate multiples G1 and G2 guarantee, in conjunction with said synchronous controls of the writing into the receiving word memory and of the reading from the receiving index memory, that each PCM word is written in and read out once within a frame but that the write-in and read-out never disturb one another. This is also shown in the time diagram in FIG. 1 where, in the file incoming to the space stage C, the PCM words are transmitted during the second halves of the time slots. According to table 1 for example, the channel with index 69 is to be transmitted to the C stage in time slot 69, the PCM word of the channel with index 69 is read out from the receiving word memory during the second half of the time slot 69, which word has been written into the receiving word memory in the same frame during the first half of time slot 69. If, according to table 1, for example, the channel with index 126 is to be transmitted to the C stage in time slot 125, the PCM word of the channel with index 126 is read out from the receiving word memory during the second half of time slot 125, which word has been written into the receiving word memory during the first half of time slot 126 in the preceding frame period. Said two examples represent the shortest and longest possible times, respectively, for transmission of an incoming PCM word into the space stage C of the exchange.

It is assumed that the number of outlets from the first time stage corresponds to the number of incoming links. Of the first time stage A, FIG. 4 shows only the receiving substage associated with the address aa, the outlet of which substage combines the read-out files from the receiving word memory SA and the address memory AB belong to that address aa. In the address memory AB, which is read synchronously with the receiving index memory, addresses of outgoing links ab are so registered that the links address to which a specific channel of the incoming link is to be transmitted is read during the same time slot during which the said channel index is registered in said receiving index memory. According to the example chosen in FIGS. 1 and 2, for the time slots 69 and 125 in FIG. 1 the address ab of the outgoing link is registered in the address memory included in the aa part of the A stage. Said addresses are transmitted to said outlet of the A stage via a gate multiple G3 which is connected to the outlet $\phi tp1$ of the clock generator, so that from an A substage there is sent during the first half of a time slot the address of the outgoing link to which must be transmitted the PCM word which is sent during the second half of the same time slot. This is shown in the time diagram in FIG. 1 under the heading C-in-ADR where, in the file entering the C stage, is transmitted during the first half of a time slot an address bit ADR which is alloted to each PCM bit transmitted during the second half of the respective time slot.

The space stage C of the exchange comprises rows and columns of a switching network of files. FIG. 4 is so drawn that each file from the first time stage A forms one of the rows of the switching network and that as many columns are formed by files to the second time stage B of the exchange. To each row is connected, via a gate multiple G4 which is activated by outlet $\phi tp1$ of the clock generator, an address decoder CA, so that the addresses of outgoing links arriving during the first halves of the time slots to determine the column to which the respective row is to be switched during the respective time slot are received and decoded. Said address decoders have their outlets connected to file gates G5 functioning as file contacts, each of which file gates connects the respective row to one of the columns in the switching network so that each PCM word is transmitted to the addressed outlet file of the C stage of the exchange. The C stage switching network FIG. 4 shows only the file row coming from the aa part of the A stage, with associated address decoder, and the file gate G5 which connects said row to the column which transmits PCM words to the ab part of the B stage. The time diagram in FIG. 2 shows that, on the file from the C stage, the addresses are transmitted during the first, and the PCM words during the second, halves of the time slots and that a transmission from a row to a column in the C stage, e.g. during time slots 69 and 125, is effected without time displacement.

In the second time stage B of the exchange each file coming from the space stage C feeds an associated sending word memory SB to which a sending index memory IB is allotted. The sending index memory, which is read synchronously with the receiving index memories and address memories of the first time stage, controls via a gate multiple G6 connected to the outlet $\phi tp2$ of the clock generator and a decoder, the input into the sending word memory so that a PCM word coming from the C stage during the second half of a time slot is written into the index which for that time slot, e.g. according to table 2, is registered in the sending index memory. Finally the PCM words are read out of the sending word memory, synchronously with said input into the receiving word memories, during the first halves of the time slots, so that the output and input in the sending word memory do not disturb one another. Each 8-wire outlet from the sending word memory is connected to one of the outgoing links of the exchange, of which FIG. 4 shows only the ab link and the associated sending substage in the second time stage. In the time diagram in FIG. 2 is shown said outgoing link MUX-2-out-*ab* with PCM words transmitted in parallel form during the first halves of the bit lengths. The conversion of the bit sequences described in conjunction with table 2 is effected through said decoding on input into the sending word memory. If, according to table 2 for example, a word coming from the C stage in time slot 125 is to be transmitted to an outgoing channel with channel index 125, a time displacement of one frame takes places owing to the fact that the input and output are carried out during, respectively, the second and first halves of the respective bit length, while a transmission from, for example, slot number 69 to channel index 70 causes the respective PCM words to be written in and read out from the sending word memory in two successive halves of a bit length.

Apart from said parts of an exchange, i.e., 1) a common clock generator, 2) at least one receiving memory, one receiving index memory and address memory for each incoming link, 3) at least one sending word memory and one sending index memory for each outgoing link and 4) for all incoming and outgoing links the switching network of the space stage with an address decoder for each incoming file, no other exchange equipment is occupied during a call in progress.

If the first and second time division multiplex systems consist of the aforesaid MUX-2 system, the exchange is equipped for 8-bit parallel technique, which is preferentially used also for the address and index memories AB, IA and IB. The exchange is thus extendable to 256 receiving and sending substages, each with its address, and to 256 channels, each with its index, in each substage in the first and second time stages respectively. This means that two MUX-2 links are connected to each substage and that $2 \times 128 \times 256 = 65536$ incoming PCM channels are transmitted to the same number of outgoing channels in an exchange extended to maximum capacity. This, however, is the theoretical maximum transmission capacity. A reservation must be made, since some of the channels are used for signalling and for synchronization or supervision, as will be described in the sequel.

If, in a receiving substage, time slots are allotted to 256 channels in two incoming MUX-2 links and, if the MUX-2 system is used also for the files between the time stages via the space stage, at least two files from each receiving substage are obtained. If such an exchange is to work on a non-blocking basis, redundance is needed according to known exchange technique, i.e., each substage in the first and second time stages obtains four files outgoing from and incoming to the space stage respectively, the space stage being divided into four independent file contact planes, in each of which the incoming and outgoing files are connected to their respective substages in the first and second time stages.

FIG. 5 shows a time substage AB*a* with address *a*, comprising a receiving substage associated with the first time stage and a sending substage associated with the second substage in a non-blocking exchange equipped to maximum capacity. The time substage is made up of four indentical time stage units AB*a*1 – AB*a*4, each of which has one outgoing and one incoming file connected to its associated file contact planes C1 – C4 (the time stage units AB*a*2 and AB*a*3 are merely indicated in FIG. 5). Each time stage unit is connected to the two incoming and two outgoing MUX-2 links *a*I, *a*II and *b*I, *b*II of the time substage with the corresponding address a and, for each incoming and outgoing link, comprises a receiving and a sending word memory SAI, SAII and SBI, SBII, respectively, which for input and output of PCM words are connected to the links *a*I, *a*II and *b*I, *b*II, respectively, and which for output and input are jointly connected to the files Cin and Cut, respectively, incoming to and outgoing from the associated file contact plane. Each time stage unit also comprises a receiving index memory IA, a sending index memory IB and an address memory AB and cyclically working scanning devices of the type described in conjunction with FIG. 4. For the addressing of PCM words for output from the receiving word memories SAI and SAII and for input to the sending word memories SBI and SBII the channels of, for example, links *a*I and *b*I are defined by the indexes 0–127 and the channels of links *a*II and *b*II by indexes 128–255. The which indexes 0–255 are read out from the receiving index memory IA and sending index memory IB and decoded in associated decoders which execute said addressing in the receiving and sending word memories as described in conjunction with FIG. 4. For the sake of clarity the synchronization devices and gate multiples described in conjunction with FIG. 4 have been omitted from FIG. 5. On the other hand there is indicated in FIG. 5 that the switching order memories IA, IB and AB associated with each time stage unit are fed for input via the file C out coming from the associated file contact plane, as will be described hereinafter.

The choice of the same time division multiplex system for the files between the time stages as is used for the incoming and outgoing links is advantageous from the standardization point of view. If the two systems differ, however, the number of time positions per frame in the second system must be a multiple of the number of channels in the first system.

Usually the PCM words are obtained on an incoming MUX-2 link in a known manner from the PCM words on four MUX-1 links, which are standardized and transmit said PCM words consisting of 8 bits by serial transmission and $n_1 = 32$ channels per link, each channel being defined by one of the indexes 0–31. In a serial transmission system of this kind the bit frequency will be $f_{b1} = m \cdot n_1 \cdot f_s$, i.e., for an MUX-1 link $f_{b1} = 8 \cdot 32 \cdot 8{,}000 = 204{,}800$ c/s, i.e., twice the bit frequency of an MUX-2 link and equal to the stepping frequency of the clock generator. From this it is apparent that division of a bit length of a MUX-2 link and a time slot, respectively, into the required first and second halves does not place greater technological requirements on said principal parts than are placed on an exchange which directly transmits incoming MUX-1 links to outgoing MUX-1 links.

In a standardized MUX-1 link the channel with index 0 is used for synchronization and supervisory signals, channels with indices 1–15 and channels with indices 17–31 as speech channels, and the channel with index 16 as a signal channel for all 30 speech channels. On the signal channel signal words are transmitted. A signal word consists of 4 bits so that, during a frame, signals for two specific speech channels are transmitted so that it takes at least 15 frames until the signal words for all speech channels have been transmitted once. A so-called multiframe, for which control signals are obtained on the outlet $\phi mr$ of the clock generator, consists of 16 frames and thus accommodates an additional frame for a few of signal words not used in conjunction with the invention.

FIG. 6 shows a known method of converting a series transmission into a parallel transmission and, with the guidance of the example, of obtaining PCM words on a MUX-2 link from the PCM words on the four MUX-1 links I–IV. Each MUX-1 link is connected to an allotted conversion memory SM into which, synchronously with the other conversion memories, the series transmitted PCM words are written and from which the PCM words are read in parallel, the outlets of the conversion memory being activated per channel during the time corresponding to $8/f_{b1} = 4/f_{b2}$ seconds, i.e., four MUX-2 bit lengths. To avoid errors the output is displaced in time about ½ frame towards the input. The synchronization of the conversion memories is achieved by means of the pulses $\phi/2$, $4\phi$, $\phi r + ½$ and $\phi r$ from the respective outlets of the clock generator, as shown in FIG. 6.

Each conversion memory is connected to one of four gate multiples G7 which have their outlets connected in parallel to a link for parallel transmission. If the gate multiples G7 are controlled by means of the aforesaid outlets $\phi_I - \phi_{IV}$ of the clock generator, the $4/f_{b2}$ periods are divided cyclically into four successive first halves of the MUX-2 bit lengths, and such a MUX-2 link is obtained, which can be connected directly, i.e., without using the aforesaid gate multiple G1, to a receiving word memory SA, as shown in FIGS. 6 and 10.

For conversion of the PCM word on one of the outgoing MUX-2 links from the second time stage of the exchange into PCM words on four MUX-1 links, each fourth MUX-2-PCM word in parallel form is written, by means of gate multiples, in a manner reciprocal to the series-parallel conversion, into a conversion memory for output thence in series about ½ frame later.

For the example assumed in tables 1 and 2 and in FIGS. 1 and 2 for engaged incoming and outgoing MUX-2 channels, table 3 shows which corresponding incoming and outgoing channels are engaged in which of the MUX-1 links I – IV.

Table 3

| | | | | | | | | | | | |
|---|---|---|---|---|---|---|---|---|---|---|---|
| MUX-1-in | link No. | I | II | III | IV | I | II | III | IV | II | III |
| | channel No. | 1 | 1 | 1 | 1 | 16 | 16 | 16 | 16 | 17 | 31 |
| MUX-2-in | channel No. | 4 | 5 | 6 | 7 | 64 | 65 | 66 | 67 | 69 | 126 |
| MUX-2-ut | channel No. | 4 | 7 | 68 | 69 | (71) | | | | 70 | 125 |
| MUX-1-ut | link No. | I | IV | I | II | (IV) | | | | III | II |
| | channel No. | 1 | 1 | 17 | 17 | (17) | | | | 17 | 31 |

In the time diagrams in FIGS. 1 and 2 there is shown at the top and bottom said series-parallel and parallel-series conversion in accordance with table 3. The conversions and the time displacements of a half frame per conversion are illustrated by certain reference lines between the respective bits. Each incoming MUX-1-PCM word comprises in its channel the bits *a*, *b* . . . *h* in series which, after conversion, are transmitted in parallel on the respective wires *a*, *b* . . . *h* of the MUX-2 link incoming to the first time stage, and each MUX-2-PCM word outgoing in parallel on wires *a*, *b* . . . *h* from the second time stage is transmitted after conversion with the bits *a*, *b* . . . *h* in series on a channel of one of the four MUX-1 links I - IV.

In the following it is assumed that every incoming MUX-2-PCM word has been formed as above from MUX-1-PCM words. Accordingly the 128 channels of a MUX-2 link are distributed over 120 speech channels with channel indexes 4–63 and 68–127, four synchronization and supervisory channels with channel indexes 0–3 and four signal channels with channel indexes 64–67. This subdivision of the channel indexes is constant for all incoming and outgoing MUX-2 links, so that for the respective channel indexes PCM words pcm, supervisory words ko and signal words so are registered in all receiving and sending word memories as shown in FIG. 4.

For output from a receiving word memory the said four signal channels are decoded with the aid of the receiving index memory in four time positions for which, in the associated address memory, a special address sir to a signal receiver SIR is registered. The special address, which is decoded in the address decoder of the space stage, opens the path for signal words to a signal column sik in the space stage, which column is connected to the signal receiver as will be explained in conjunction with FIG. 7. Different incoming links are allotted different but unchangeable time slots for the transmission of signal words (according to the example in table 1 and FIGS. 1 and 4 the signal channel indexes 64–67 are converted to slot numbers 4–7 for which said special address sir is registered in the address memory BA) so that signal words arrive at the signal receiver in an unchangeable and defined sequence although they are written into all receiving word memories simultaneously at channel indexes 64–67. As, according to the above, four signals channels are transmitted on each incoming MUX-2 link, signal words associated with at most 32 incoming defined MUX-2 links are transmitted on said signal column sik of the C stage which, like all columns, is 8-wire. A large exchange is equipped with a number of signal columns, and two as, according to the above, every signal channel comprises two signal words of 4 bits, a signal column is divided into two 4-wire systems which are connected to their respective signal receiver units. In this way, for every time slot within a multiframe, i.e., 16 frames, it is defined to which incoming PCM channel a signal word arriving in a specific signal receiver unit belongs.

Hitherto only the manner for transmission of PCM words and signal words for switching order information from the first to the second time stage and to the signal receiver, respectively, has been discussed and, accordingly, it has been assumed hitherto that the switching order information necessary for the transmission is already written into the switching order memories IA, AB and IB of the time stages. Now, on the other hand, the manner for setting up and clearing of a communication path, i.e., the manner in which the signal words arriving at the signal receiver are evaluated and in which said necessary switching order information is written into and erased from the switching order memories, will be considered. This will be described later in detail and is described in principle with reference to FIG. 7, in which a block ABal symbolizes a time stage unit in the time substage with address a and in which a block C1 symbolizes, of the space stage, the file contact plane in which the file row and file column with address a connected to the time stage unit and the signal column sig connected to signal receiver SIR are shown. In a stage memory TM common to the entire exchange for storage of state information are registered signal words associated with the preceding multiframe, which are fed synchronously with the signals words from the space stage to the signal receiver SIR in which a comparison operation is carried out between said signal words arriving from the state memory and from the space stage. In the case of equivalence no action is taken. If, on the other hand, a signal word arrives from the space stage which does not coincide with the signal word associated with the preceding multiframe, the new signal word is transmitted from the space stage together with said information stored in the state memory for the respective incoming PCM channel to a computer DM, for example of the type described in "L M Ericsson Data Processing System for Telecommunications System APZ 130", which is the known manner, in dependence on the state data received, computes the switching order information required for setting up and clearing of a communication path, which information being registered in a switching order register AR.

For selection of a free time slot for a space connection to be established between a specific row and a specific column in the space stage and, in a large exchange, in a file contact plane respectively, each plane is connected via a detecting column ak and a detecting row ar to a switching order unit AU allotted to said plane, to which unit said switching order information registered in the switching order register is transferred by means of a first control logic SL1 and the which switching order unit, by reason of non-existing addresses and PCM words in said detecting column and detecting row, selects and registers a free time slot in which addresses and PCM words are transmitted neither on the row of the file contact plane (corresponding to the incoming file according to the present setting up switching order) nor on the column of the file contact plane (corresponding to the outgoing file according to the present setting up switching order).

The switching order unit reports said free time slot to the switching order register, from which the data concerning the free time slot and concerning the identity of the switching order unit performing said switching order are transferred to the state memory together with the other data in the switching order register. Said free time slot defines the address under which must be written the channel indexes and the address which are defined by the respective switching order information. This must take place in the switching order memories which are defined by addresses in the switching order information. When an order for disconnection has been stored in the switching order register, the switching order information includes a notification of which time slot is to be zeroed in which file contact plane and in which the row, i.e., which switching order unit must erase the corresponding registrations in the switching order memories.

The input into and erasure from the switching order memories are done by the switching order unit via a transfer row or which, in the file contact plane, is connected during the time slots reserved for synchronization and supervision to the column to which the respective switching order memory is allotted. By means of a second control logic SL2 associated with each time stage unit the inputs are controlled into the respective time stages, so that the PCM words and the address data and index data of the switching order information are written into the sending word memory, address memory and index memories in question. After completion of input and erasure in the switching order memories the associated switching order unit is free again to deal with new switching order information. The processing of switching order information is completed within the time for a multiframe, so that the comparison between the signal words fed as above to the signal receiver is carried out in the normal way, wherein one signal word from the space stage is compared with the signal word associated with the preceding multiframe.

FIGS. 8–10 show for a small exchange with only one plane in the space stage an example in more detailed form of how a signal word arriving via the space stage is evaluated and how a switching order information from the computer is written into the stage memory and into the switching order memory of the respective time stage unit. Said small exchange includes, according to the preceding description, only one switching order unit and the time substages of the exchange comprise only one time stage unit each. If it is assumed as hitherto that the incoming and outgoing first time division multiplex system is coincident with the second time division multiplex system for the files between the time stages of the exchange, the time stage units are connected each to its respective incoming and outgoing link.

Figure 7:
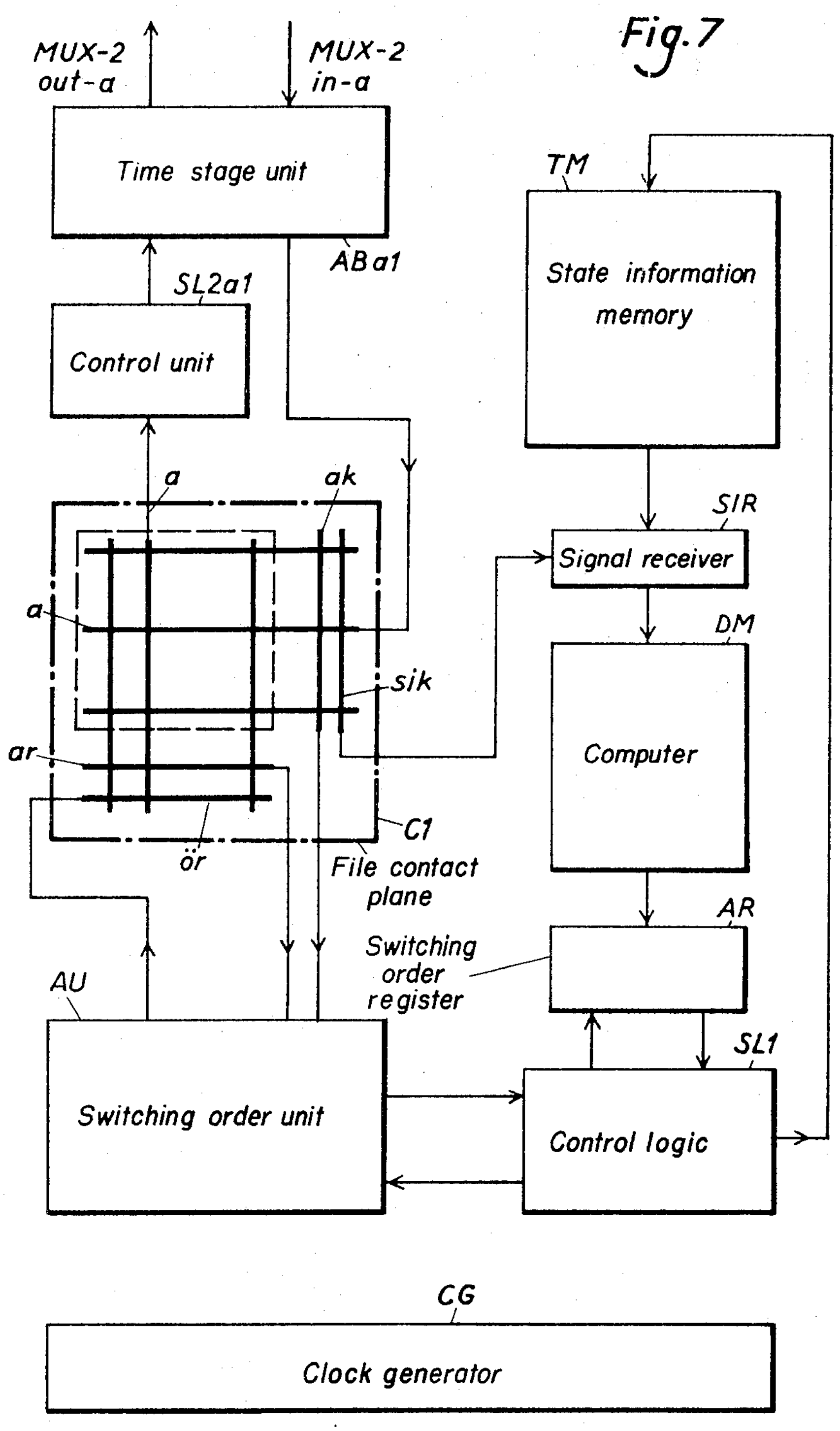

In signal receiver SIR the comparison operation referred to in conjunction with FIG. 7 is carried out for each bit of a signal word so by an EXCLUSIVE-OR gate multiple G8, the first inlet of which is connected to a signal column sik of the space stage and its second inlet to a signal word register in the state memory. FIG. 8 shows solely one of the EXCLUSIVE-OR gates and the figure symbolizes that 4 wires of the signal column are connected to 4 EXCLUSIVE-OR gates and that a gate network GN1 is activated if one of the outlets of the EXCLUSIVE-OR gates is activated. An activated gate network GN1 passes to a connected computer DM firstly the new signal word for which no coincidence has been found with the signal word registered in the state memory and, secondly, data registered in the respective register of the state memory concerning the channel to which the compared signal words relate and which channel is defined by the incoming link address *aa* and channel index *ia*. Said incoming link addresses aa and channel indexes ia read out from the state memory are unchangeably written into the respective register of the state memory which is scanned for read-out synchronously with other scannings of the exchange but with a multiframe as the scanning period. Furthermore said gate network GN1 passes from the respective register of the state memory, firstly, the information concerning the existing signal word so and signal state tst and, secondly, information concerning any call that has been set up, i.e., which time slot tp is engaged for a communication path to which outgoing channel with index *ib* and in which outgoing link with address *ab*.

The computer DM processes the signal words in conjunction with the data obtained from the state memory TM with respect to the state associated with the preceding multiframe and, inter alia, orders in known manner the setting up and clearing of calls.

Such an order contains as switching order information a signal word so, a signal state word *tst*, and incoming and outgoing link addresses and channel indexes *aa*, *ia*, *ab* and *ib*. The switching order information is stored in the respective register sections of the switching order register AR and must be registered within the scope of the order processing in the respective register sections of the state memory, as will be described below. An order from the computer also contains an information concerning a time slot *tp*(DM) which may be engaged, which likewise is stored in the respective register section of the switching order register. With the guidance of the switching order information *aa*, *ia*, *ab*, *ib* and *tp*(DM), which are transferred to the switching order unit AU (FIG. 7), a call is set up and disconnected, where the time slot information is $tp(DM) = 0$ and $tp(DM) \neq 0$, respectively, as will be described below.

As a link for transmission of PCM words in time division multiplex form is always one-way, the exchange works on the 4-wire principle and a switching order information, for example, setting up of a call from *x* to *y* can automatically signify an additional switching order information for setting up of a reciprocal call from *y* to *x*. This is defined by the computer through signal words and state data $\overline{so}$, $\overline{tst}$, which apply to said reciprocal communication paths and which are registered in the switching order register in special register sections for reciprocal calls. Finally the switching order register includes a register section which is connected to the switching order unit AU for registration of a time slot *tp*(AU) found to be free in it. The register sections of the switching order register are connected to a first control logic SL1 which scans switching order informations stored in the switching order register successively (this is not shown in FIG. 8) and which control logic controls the processing of the switching order information in dependence on whether the computer order applies to setting up, clearing, or a reciprocal call.

In a larger exchange with several file contact planes in the space stage and allotted switching order units, both the state memory and the switching order register comprise register sections for registration of the identity of the file contact plane setting up a communication path, and the first control logic SL1 selects for setting up of a call a free arbitrary switching order unit AU or, for clearing of a call, identities the switching order unit defined according to an order from the computer. Said selection and identification of one among several switching order units are not necessary in the smaller exchange shown in FIGS. 8–10.

If the switching order information relates to the setting up of a call, i.e., if the computer's time slot information *tp*(DM) is 0, activation takes place in the first control logic both of a gate network GN2 which, in activated state, passes incoming and outgoing link and channel data *aa*, *ia*, *ab*, *ib* to corresponding inlets of the switching order unit AU, and of a gate multiple G9 for transferring of time slot data *tp*(AU) arriving from the switching order unit to the respective register section of the switching order register, which register section, owing to a registered time slot *tp*(AU), activates a gate network GN3 for transferring from the switching order register both of the data concerning the incoming link address *aa* and channel index *ia* to a decoder in the state memory and of the data concerning the time slot *tp*(AU) selected by the switching order unit, the address and index data *ab*, *ib* of the outgoing channel and pertinent signal word and signal state data so, tst to the respective inlets of the state memory for input under the decoded incoming channel address.

If a call is to be cleared, the switching order information fed from the computer to the switching order register includes an information concerning the time slot *tp*(DM) engaged for the communication path. A registration in the respective register section activates in the first control logic both a first activation inlet of a gate network GN4 and a gate network GN5 which, in activated state, passes the incoming link address aa from the switching order register and said time slot information *tp*(DM) to corresponding inlets of the switching order unit AU. Said gate network GN4 has a second activation inlet connected to an outlet au of the switching order unit AU (FIG. 7) and is activated when both of said inlets are the activated. In activated state the gate network GN4 passes from the switching order register both the incoming link address aa and the channel index ia to the decoder for input into the state memory TM, and the informations concerning signal word and signal state so, tst to the respective registers in the state memory, and "0" signals to the register sections in the state memory which register time the slot, outgoing link address and outgoing channel index. Thereby the respective incoming channel in the state memory is marked free. Said "0" signals are obtained from the switching order register section which contains time slot *tp*(AU) and is blocked during the processing of a clearing order by the gate multiple G9.

If the data from the computer include signal words and signal state data $\overleftrightarrow{so}$, $\overleftrightarrow{tst}$ for setting up or clearing of a reciprocal call, activation takes place in the first control logic of a gate network GN6, which in activated state passes from the switching order register the outgoing link address *ab* and channel index *ib* to the decoder for input into the state memory, the incoming link address aa and channel index *ia* to the registers for the outgoing link address *ba* and channel index *ib* in the state memory, and signal word data and signal state data relevant to the reciprocal call to the signal word and signal state registers in the state memory, so that, in its subsequent reading of the state memory, the computer IM receives the data with which a switching order information for a reciprocal call is calculated. Simultaneous activation of the gate networks GN3 or GN4 together with GN6 is impossible since the gate networks GN3 and GN4 are activated at the earliest one frame after the start of processing of a switching order information stored in the switching order register, as will appear from the description of the switching order unit AU.

According to the example shown in FIG. 9 the switching order unit AU 4 contains registers in which said data *aa*, *ia*, *ab*, *ib* from the first control logic SL1 (FIG. 7) are registered. The registration in said registers of the switching order unit is, however, blocked by a gate network GN7 if an incoming link address aa is already registered, i.e., if the switching order unit is engaged. Addresses for incoming and outgoing links *aa* and *ab* respectively, registered in the switching order unit, are decoded by decoders connected to the respective registers. The decoders activate file gates G10 and G11 in the file contact network of the space stage C. An activated file gate G10 or G11 connects in the C stage the incoming file row and outgoing file column respectively, determined by the respective registration in the switching order unit, to the switching order unit via the detecting column ak and detecting row ar respectively, referred to in conjunction with FIG. 7, all parallel wires of which are connected to their respective inverting inlets in a time selection gate G12 which is activated by the outlet $\phi tp1$ of the clock generator during the first halves of the time slots.

The switching order unit contains an 8-bit counter R which is started by a signal from a start gate G13 activated by a frame pulse from the outlet $\phi r$ of the clock generator after the register of the switching order unit for the incoming link address aa has been engaged, and the positions 0–255 of which counter are stepped by the outlet $\phi$ of the clock generator synchronously with other scannings in the exchange. The counter has 8 outlets. During positions 128–132 of the counter a signal is received successively on the outlets denoted 128–132 and during each of positions 4–127, 129–130 and 129–131 of the counter a signal is received on a specific outlet denoted (4–127), (129–130) and (129–131) respectively: Said outlet 128 blocks the start gate G13 during the frame pulse following after the latter frame pulse and said outlet (4–127) is connected to an inlet of said time selection gate G12. The state of the counter is registered in a time slot register TP1 of the switching order unit via a gate multiple G14 which is activated by said time selection gate in such time slot, one of the positions 4–127 of the counter, during which for the first time there is no address either on the row of the incoming file or on the column of the outgoing file in the space stage. In this way said time slot register registers in the switching order unit a time slot tp which is free for the communication path according to the switching order data aa and ab registered in the switching order unit. Further registrations of free time slots are stopped through the fact that the time selection gate G12 is activated solely if the time slot register is zeroed.

The time slot selected by the switching order unit is transferred via a gate multiple G15 which is activated during positions 129–131 of the counter to said inlet tp (AU) of the first control logic SL1. Said outlet au of the switching order unit is connected to outlet (129–131) of the counter, so that the gate network GN4 of the first control logic is activated solely if the processing of a clearing order is in progress in the switching order unit.

For the input of the respective switching order information into the respective switching order memories of the time stages the switching order unit is connected to the transfer row or of the space stage C referred to in conjunction with FIG. 7 which, through file gates G16, is connected to columns of the C stage. Which of the file gates G16 is activated is defined by the addresses registered in the switching order unit for the incoming link *aa* and the outgoing link *ab*, in the manner that decoders associated with the registers for incoming link addresses *aa* and for outgoing link addresses *ab* respectively in the switching order unit are connected to gates G17 and to gates G18 respectively. Each gate G17 has a second inlet connected to the outlet (129–130) of the counter and each gate G18 has a second inlet connected to outlet 131 of the counter. The outlets of each pair of gates G17 and G18 are connected to their respective file gate G16. In this way the transfer row or is connected during positions 129 and 130 and 131 respectively, of the counter to the column in the C stage defined by addresses for the incoming and outgoing links.

To the transfer row there is transferred, firstly, the time slot registered in the switching order unit via a gate multiple G19, which is activated by outlet $\phi tp1$ of the clock generator and is connected to said gate multiple G15, secondly the outgoing link address, the channel address for the incoming link and the channel index for the outgoing link all of which are registered in the switching order unit via gate multiples G20, G21 and G22 which are activated by outlet $\phi tp2$ of the clock generator and by outlets 129, 130 and 131 respectively of the counter.

The outlet of the counter R which is activated in position 132 is connected to zeroing inlets of all registers in the switching order unit and of the counter itself, so that the switching order unit frees itself for processing of new switching order information when the counter has advanced to said position 132.

According to the preceding description there are transferred to the first and second time stages of the exchange, during the first halves of time slots 1–3 of a frame address informations relating to the time slot for which switching order words are to be written into the respective switching order memory, whereas during the second halves of said time slots there are transferred said switching order words, since the positions 129, 130 and 131 defined by the counter of the switching order unit always coincide with slot numbers 1, 2 and 3 of time slots 0–127 of a frame.

The transfer of switching order words to time stages of the exchange via file column C out of the space stage is shown also in the time diagram FIG. 2 where, during the first time slots 1 and 2 shown, are transferred time slot addresses and words of a first processed switching order information which concerns the incoming link to the time substage with the respective address. It is assumed that the addresses aa and ab of the links shown in the time diagram differ, for which reason the bit sequences in FIGS. 1 and 2 are not changed owing to said first switching order information. But, according to the example in FIG. 2, there is transferred during the second shown time slot 3 that part of a second processed switching order information which causes input into the sending index memory of the outgoing link. It is assumed that said second switching order information relates to setting up of a communication path and during a time slot 7 selected by the switching order unit, an ordered channel index 71 is added to tables 2 and 3. FIG. 2 shows the bit sequences extended by one bit by reason of the second switching order information on the file $C_{ut}$ in time slot 7 and on link MUX-2-*ut* in the channel with index 71.

FIG. 10 shows an example of a time substage in which the bit sequence coming from the space stage is fed to first inlets of gate multiples G23–G27 in a second control logic SL2 associated with said time substage. The gate multiple G23 has an inverting second inlet connected to outlet $\phi$ 1–3 of the clock generator and has its outlet connected to the sending word memory SB, so that the input is blocked there during time slots 1–3. In the gate multiples G24, G25 and G26 a second inlet of each is connected to outlet $\phi tp2$ of the clock generator and a third inlet is connected to outlets $\phi$ 1, $\phi$ 2 and $\phi$ 3 respectively, of the clock generator and the outlets are connected to the address memory, receiving index memory and sending index memory, respectively, of the time substage. Each second control logic includes a register for time slot data TP2, which register is fed from said gate multiple G27 which is activated during the first halves of the time slots so that the time slot address transferred from the switching order unit via the transfer row is registered in said time slot register TP2 of the second control logic SL2 connected via a specific file gate G16.

The receiving index memory, address memory and sending index memory, which are associated with a specific time substage with the same address number for the incoming and outgoing links have a common input decoder connected to said time slot register TP2 of the allotted second control logic, so that the switching order words coming from the switching order unit are written in under the addresses determined by the content of the time slot register in the respective switching order memory AB, IA, IB.

As mentioned in connection with FIG. 8, if a communication path is to be cleared solely the incoming link address aa and the data of the time slot *tp*(DM) which is to be freed are transferred from the switching order register AR to the respective register in the switching order unit AU. As an engaged time slot register TP1 in the switching order unit blocks the time selection gate G12, and as the registers of the switching order unit for the outgoing address ab and for the channel indexes *ia* and *ib* remain zeroed during the processing of a clearing order, no detection takes place in this case during positions 4–127 of the counter R and, during positions 129 and 130 of the counter, addresses *tp*(DM) and "0" informations are transferred from the switching order unit via the transfer row or in the above described manner to the receiving unit of the time substage where, by means of the associated second control logic SL2, the address *tp*(DM) is decoded and the "0" informations are written into the associated address memory and the receiving index memory, whereby the ordered erasures are achieved. A corresponding erasure in the sending index memory associated with the outgoing link address is not needed for clearing of a communication path.

The invention has been described above by using an exchange, where the transmission of the PCM words is carried out in parallel form. It will be apparent to those skilled in the art that by an increase of the frequency on the files, according to the example 8 times, the PCM words and addresses can be transmitted in series form, although this seems to be advisable at present only for special arrangements in small exchanges.

We claim:

1. A time stage system for a PCM exchange utilizing an assemblage including a first time stage, a space stage with file contact planes and a second time stage with files connecting the first time stage to the contact planes of the space stage and further files connected the contact planes of the space stage to the second time stage wherein PCM words are received on incoming transmission links connected to the first time stage and the PCM words are transmitted on outgoing transmission links connected to the second time stage in first time slots associated with a first time division multiplex system, wherein the PCM words are transferred from the first time stage via the files and the space stage to the second time stage in second time slots associated with a second time division multiplex system, each of the PCM words being identified by a receiving and sending index and an address number allotted to the file through which the PCM words will be transferred from the first time stage to the second time stage, a clock means for the exchange including a clock generator defining the first and second time slots to have equal durations and the start of a first time slot coinciding with the start of a second time slot, the clock means also including means for generating in each of the second time slots two successive activating pulses, the exchange further including first and second scanning means connected to the clock means for performing memory scanning operations in synchronism with the first and second time division multiplex systems, respectively, said time stage system comprising a plurality of time substages, each of said time substages being connected to at least one associated incoming link and to at least one associated outgoing link of the transmission links and comprising a plurality of identical time stage units each being connected to all of the incoming and outgoing links connected to its time substage and furthermore connected to one associated file of the files going to and connected to one associated file of the files coming from the file contact plane cooperating with the time stage unit, each time substage including as many time stage units as there are file contact planes in the space stage, each time stage unit comprising at least one receiving word memory and at least one sending word memory which for writing and reading of PCM words, respectively, are connected to their respective link of the links associated with the time substage and to the first scanning means whereby PCM words are transferred between the associated links and the sending and receiving word memories under the control of said first scanning means, said receiving and sending word memories being provided with a receiving and a sending decoder means for decoding receiving and sending indices, respectively, and being connected to the outgoing and incoming file associated with the time stage unit, each time stage unit further comprising a receiving index memory and a sending index memory for storage of the receiving and sending indices, means for connecting said receiving index memory and said sending index memory to said receiving and sending decoder means, respectively, and means for connecting said second scanning means to said sending index memory and said receiving index memory whereby PCM words are transferred between the associated files and the sending and receiving memories at times indicated by the index memories under control of said second scanning means, and an address memory for storage of the address numbers allotted to the files coming from the space stage, said address memory when reading being connected to the second scanning means and to the file going to the space stage, each time stage unit furthermore comprising first blocking means connected to the clock generator for preventing, during the first of the successive activation pulses, reading from the receiving word memories and writing into the sending word memories, and for preventing, during the second of said successive activation pulses, writing into the receiving word memories and reading from the sending word memories and from the address memory.

2. Time stage system according to claim 1 in which each of the time stage units further comprises a time slot register for registration of a slot number identifying one of the second time slots, and for the purpose of such registering being connected to the incoming file of said time stage unit, means for connecting said receiving index memory, said sending index memory and said address memory of each time stage unit, for the purpose of writing, to the incoming file of the time stage unit and a slot number decoder connected to said time slot register, each time stage unit further comprising second blocking means connected to the clock generator and operative during the first of the activation pulses in predetermined second time slots for preventing writing into said sending word memories and for allowing writing into said time slot register respectively, and said second blocking means further allowing, during the second of said activation pulses in their respective selected second time slot of said predetermined second time slots, writing into the receiving index memory, into the address memory and into the sending index memory of said time stage unit.

* * * * *